(12) United States Patent
Badenell et al.

(10) Patent No.: US 7,954,140 B2
(45) Date of Patent: May 31, 2011

(54) METHODS FOR PERSISTING, ORGANIZING, AND REPLACING PERISHABLE BROWSER INFORMATION USING A BROWSER PLUG-IN

(75) Inventors: Jon Badenell, Marietta, GA (US); Joseph A. Pearson, Kennesaw, GA (US)

(73) Assignee: The Weather Channel, LLC, Atlanta, GA (US)

( * ) Notice: Subject to any disclaimer, the term of this patent is extended or adjusted under 35 U.S.C. 154(b) by 1093 days.

(21) Appl. No.: 11/023,799

(22) Filed: Dec. 28, 2004

(65) Prior Publication Data

US 2006/0143697 A1    Jun. 29, 2006

(51) Int. Cl.
G06F 7/04    (2006.01)
(52) U.S. Cl. ............................. 726/8; 726/9; 726/10
(58) Field of Classification Search .............. 726/8, 9, 726/10
See application file for complete search history.

(56) References Cited

U.S. PATENT DOCUMENTS

| | | | | |
|---|---|---|---|---|
| 5,913,033 | A * | 6/1999 | Grout | 709/219 |
| 5,919,033 | A * | 7/1999 | Singleterry et al. | 417/310 |
| 6,269,403 | B1 * | 7/2001 | Anders | 709/231 |
| 6,594,682 | B2 * | 7/2003 | Peterson et al. | 718/102 |
| 6,738,469 | B1 * | 5/2004 | Peirce et al. | 379/218.01 |
| 7,197,568 | B2 * | 3/2007 | Bourne et al. | 709/229 |
| 7,240,192 | B1 * | 7/2007 | Paya et al. | 713/152 |
| 7,356,575 | B1 * | 4/2008 | Shapiro | 709/220 |
| 2002/0032839 | A1 * | 3/2002 | Yamamoto et al. | 711/118 |
| 2003/0051215 | A1 * | 3/2003 | Nakao | 715/513 |
| 2004/0243939 | A1 * | 12/2004 | Perepa et al. | 715/739 |
| 2005/0240599 | A1 * | 10/2005 | Sears et al. | 707/10 |
| 2006/0031404 | A1 * | 2/2006 | Kassab | 709/218 |
| 2006/0143697 | A1 * | 6/2006 | Badenell et al. | 726/10 |
| 2008/0033961 | A1 * | 2/2008 | Berglund et al. | 707/10 |
| 2008/0102431 | A1 * | 5/2008 | Rogers et al. | 434/350 |

OTHER PUBLICATIONS

U.S. Appl. No. 11/023,799, filed Dec. 28, 2004, Pearson, et al.

* cited by examiner

*Primary Examiner* — Kambiz Zand
*Assistant Examiner* — Teshome Hailu
(74) *Attorney, Agent, or Firm* — Lawrence A. Aaronson, PC

(57) ABSTRACT

The invention is directed to methods for identification of users communicating with web servers by replacing or creating browser information associated with a user. In one embodiment, a local object store containing cookie values or URL data on the user's computer is accessed when a web page is rendered. The values stored in the local object store are used to recreate cookies that have been deleted from the computer's web browser or the URL data is used to identify web pages that the user has downloaded. Once recreated, the cookies may be placed back in the web browser or the URL data may be used by the web-server in targeting the user for advertisements, personalization, etc.

18 Claims, 4 Drawing Sheets

METHODS FOR PERSISTING, ORGANIZING, AND REPLACING PERISHABLE BROWSER INFORMATION USING A BROWSER PLUG-IN

FIELD OF THE INVENTION

The present invention relates in general to the field of computer science. More particularly, the present invention relates to methods for web server identification of a user of a computer.

BACKGROUND OF THE INVENTION

One problem for web advertisers and others that want information about a computer user is identifying the user. Web advertisers, for example, may want to target advertisements to users. The most common method for identifying a user is through browser cookies. A cookie may be a text string that the browser returns with each request and that each response can add to, update, or delete.

Unfortunately, cookies are perishable. That is, cookies may be deleted by a user, may expire, or may be forced out of the browser cookie store by other cookies. Additionally, browsers may only accept a limited number of cookies from any domain. There are other limitations on cookies as well. Browsers may limit cookies to 1024 characters of text. Cookies may be specific to each browser on a computer and different browsers on the same computer may have different cookies. Also, different computers may have the same user but may have different cookies. For these and other reasons, it may be difficult to target advertisements, for example, to an individual user.

One solution to the problems associated with the perishable nature of cookies is to have users identify themselves. Such identification may be accomplished by requiring the users to log-in each time they want to use a site. The requirement for a log-in may present a more secure website, useful for those that provide financial transactions or otherwise require personal data. This requirement, however, may deter casual users and thus may reduce wanted user traffic on other types of sites.

Therefore, there is a need for enabling web servers to identify users without deterring casual users or otherwise reducing traffic. The solution should take into account the perishable nature of browser cookies.

SUMMARY OF THE INVENTION

The present invention is directed to methods for identifying users that take into account the perishable nature of browser cookies and other browser information without deterring user access. The invention includes a method for replacing browser information associated with users by accessing a local object store on the user's computer and retrieving from the local object store browser values, such as cookie values, that may be used to replace deleted cookies. The local object store may be associated with a plug-in, such as Macromedia Flash Plug-in for Flash animation files, included with the computer's web browser. The local object store, however, may be stored outside of the browser. The deletion of a cookie from the web-browser may not affect the contents of the local object store, and therefore, values stored in the local object store associated with cookies may be used to recreate the user's cookies. Once recreated, the cookies may be placed back in the browser for use by the web-server in targeting the user for advertisements, personalization, etc.

In the event that the user or the web browser, for example, does not use cookies, the invention includes a method for inserting user-specific browser values on a web page downloaded by the user from the web server. This user-specific information may be saved in the local object store and may be accessed later to identify the user.

The foregoing and other aspects of the present invention will become apparent from the following detailed description of the invention when considered in conjunction with the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
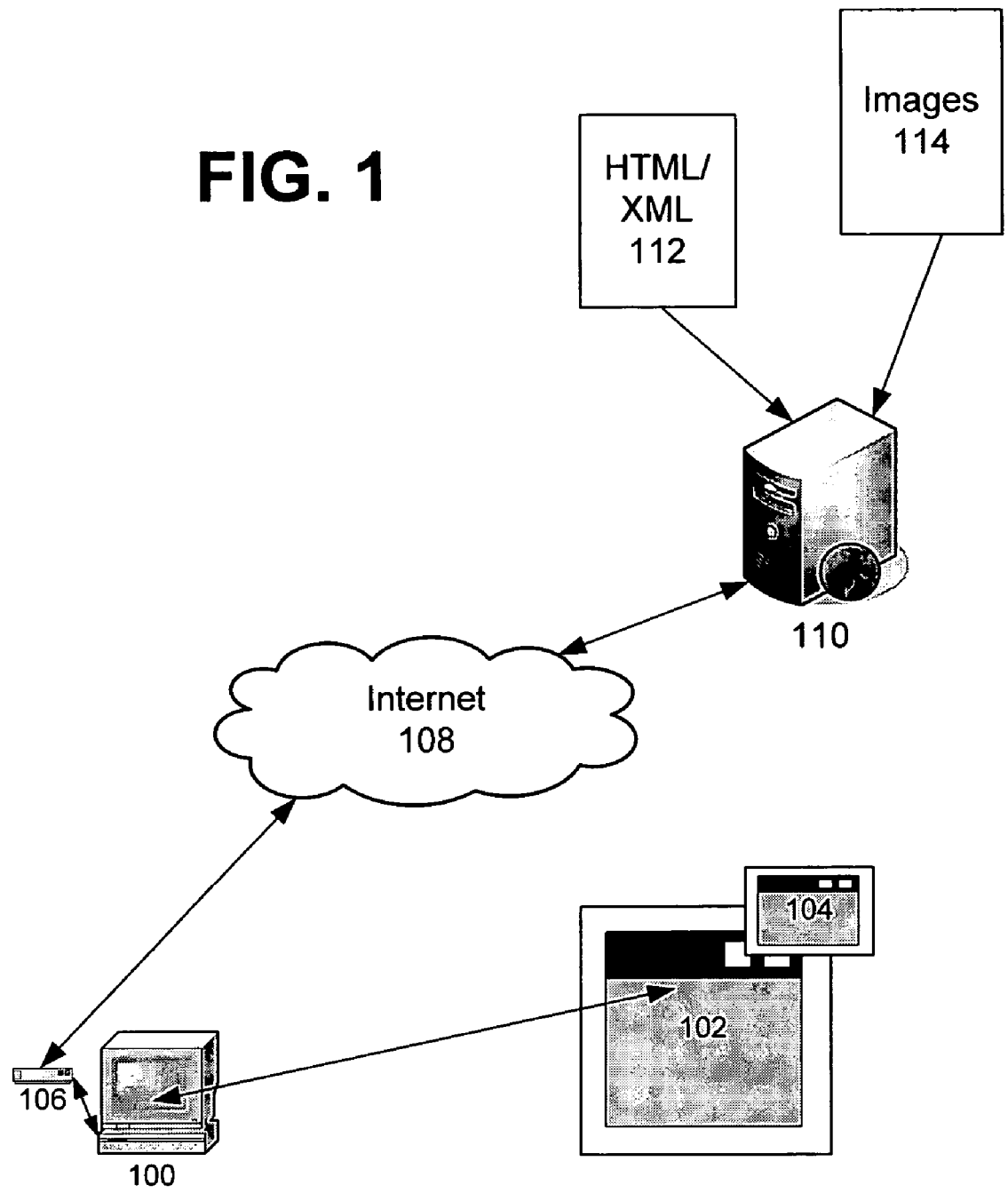
FIG. 1 is an overview of an example environment in which the present invention may be implemented.

FIG. 1 illustrates an overview of an environment in which embodiments of the present invention may operate. A personal computer 100 may run a web browser 102 to fetch and display web pages. Web pages may include HTML pages, XML pages, or similar web pages. In this example implementation, the web browser 102 may be any web browser such as Internet Explorer, Netscape Navigator, Mozilla Firefox, etc. The web browser 102 fetches HTML, XML, or other similar web pages from a web server 110 via a modem 106 (e.g., cable modem, DSL modem, or conventional modem) connected to the Internet 108. The web server 110 serves, e.g., HTML/XML pages 112 and images 114. Other media, such as flash media, video, audio, etc., may be played by a player 104 that is embedded in the web page as displayed in the browser 102 or a separate application.

When a user connects to the web server 110, the browser 102 points to a specified URL of the HT XML page 112 to be retrieved. A TCP/IP connection is established with the web server 110 and a request is issued for the page stored at the specified URL by issuing an HTTP request to the server 110. In addition to HTML/XML code, this page may incorporate other information content, such as images 114, audio, video, executable programs, etc. The page 112 and images 114 may be stored as files in a file system of the web server 110. The page 112 may incorporate the images 114 using HTML/XML tags that specify the location of files or other Internet resources containing the images on the Internet 108.

Figure 2:
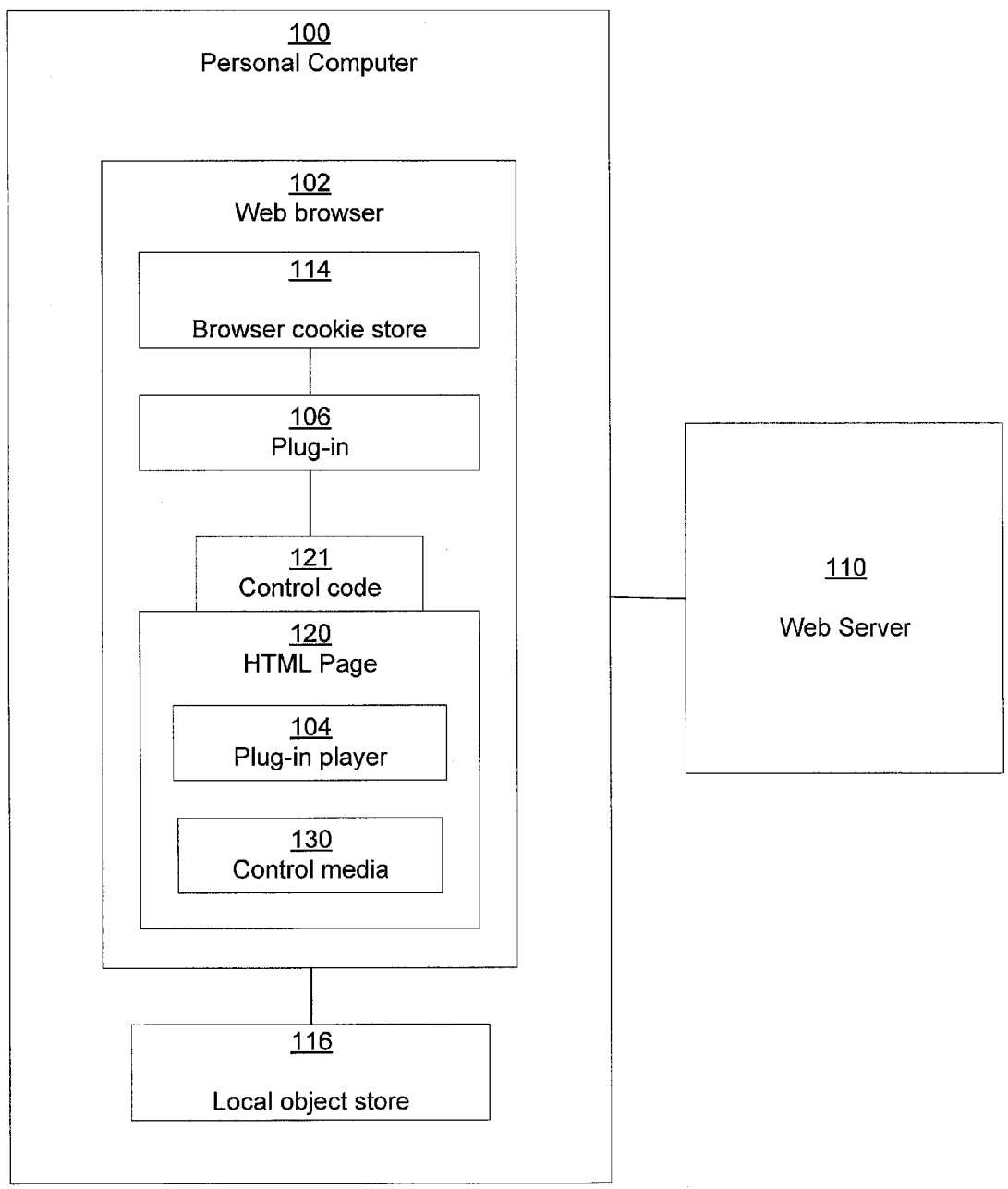
FIG. 2 is a block diagram of a personal computer and a web server in accordance with one example embodiment of the invention.

FIG. 2 is a block diagram of the personal computer 100 and the web server 110 in accordance with one example embodiment of the invention. The personal computer 100 may include the web browser 102 and a local object store 116. The personal computer 100 may be in communication with the web server 110 as described with regard to FIG. 1.

The web browser 102 may include a browser cookie store 114, a plug-in 106, and a HTML page 120. One or more plug-ins such as the plug-in 106 may be provided by the web browser 102 to handle specific types of media that the web browser 102 may not understand. Examples of such plug-ins may be Macromedia Flash Plug-in for Flash animation files, Apple QuickTime Plug-in for videos, or Sun Java Plug-in for Java applications. The plug-in 106 may have the ability to store information locally on the machine. Such information may be maintained in the object store 116. The plug-in 106 also may be "scriptable," that is, it may be programmatically manipulated by code in the ITML page 120 being displayed.

The browser cookie store 114 stores cookies. A cookie is a set of data that the web server 110 may send to the web browser 102 the first time a user visits a website on the web server 110. The data may be updated with each return visit by the user of the personal computer 100 to the web server 110. The web server 110 and the web browser 102 may save the data the cookie contains about the user. Cookies can contain any information, though typically the information is used to authenticate or identify a user of a web server without requiring the user to sign in. The information may enable web server personalization such that different web pages on the web server may be presented to different users depending on interest demonstrated by the users during previous visits. The information contained in the cookies may enable tracking pages that the user has downloaded from the web server 110 for marketing or other purposes. Of course, those skilled in the art will recognize that the web browser may include any type of store for maintaining browser information about a user, and that the cookie store and cookies may be just one example of browser information maintained in the web browser.

The personal computer 100 may include other plug-ins in addition to the plug-in 106. Each plug-in may place a local object store 116, that is, a memory space specific to the respective plug-in, on the personal computer 100. The local object store 116 may be specific to the plug-in 106 but may be located external to the web browser 102. The user may not know about the existence of the local object store 116. When a user downloads the HTML page, for example, the plug-in 106 may write values to the local object store 116. The values may include information about the user such as preferences, interests, etc. These values may later be used to identify the user's preferences, etc., even if the user's cookies have been deleted or were otherwise never saved in the browser cookie store 114.

A piece of control media 130, for example a Flash movie called blank.swf, may be inserted into the HTML page 120 and special control code 121 may be added to the scripting of the HTML page 120. Such control code 121 may be, for example, JavaScript functions in externals.js. The control media 130 may have access to the local object store 116. The control code 121, such as JavaScript functions in the HTML page 120, may interact with the control media 130, which may be a movie invisible to the user of the personal computer 100. In this way, the control code 121 may be able to add or remove data from the local object store 116.

Through the plug-in 106, the specialized piece of control media 130, and the control code 121, the web server 110, through the HTML page 120 or similar web page, may be able to identify the user of the personal computer 100 even if cookies or other browser information have been deleted from the browser cookie store 114. For example, the web server 110 through the HTML page 120 may be able to "page" cookies in and out of the browser cookie store 114 so that, while only a limited number of the cookies may be active at any one time, a larger number of them will be on the personal computer 100. Additionally, the web server 110 may be able to synchronize cookies between browsers on the same machine (if both were configured to use the plug-in 106), or synchronize or re-populate cookies and the local object store 116 if the user is identified (with a customization or URL log-in). Additionally, by appending local object store 116 data to all URLs programmatically, the web server 110 may be able to tag, track, and make actionable users who have cookies turned off.

For example, in one example implementation of the invention, the invention enables the replacement of cookies deleted from the browser cookie store 114. The control media 130 may be a flash movie file. JavaScript may be contained in an external library and may be the control code 121. Both the flash movie control media 130 and the JavaScript control code 121 may be included in the HTML page 120. The user of the personal computer 100 may download the HTML page 120 from the web server 110 and when the HTML page 120 has completed rendering, the JavaScript control code 121 may be called to look for the presence of cookies for the HTML page 120 in the browser cookie store 114. If the desired cookies are not present, the JavaScript control code 121 may make a call to the code in the Flash movie control media 130 to look for saved cookie values in the Flash local object store 116. The saved cookie values may be associated with a cookie name, and the cookie name may include a URL path for which the cookie is valid. Since the Flash plug-in 106 may have its own disk space where it can store data, such as the local object store 116, the cookie values saved by the Flash plug-in 106 would not be deleted when the user clears the browser cookie files from the browser cookie store 114.

If the code in the Flash movie control media 130 finds cookie values stored in the Flash common object store, it may pass the values back to the JavaScript control code 121, and the JavaScript control code 121 can put the missing cookies back in the browser cookie store 114. The JavaScript control code 121 may then refresh the HTML page 120 for the replaced cookies to affect the server side logic, if any.

Figure 3:
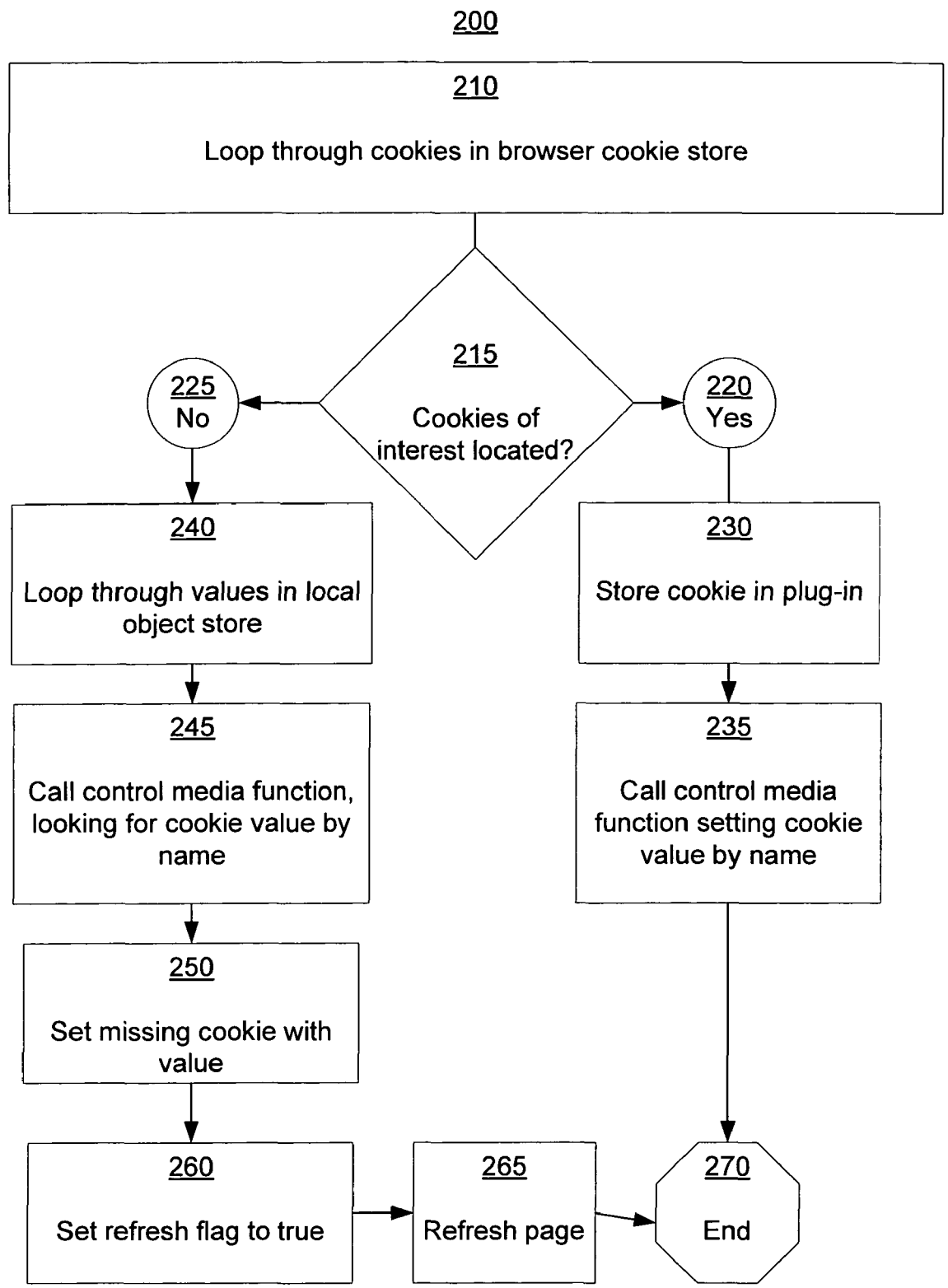
FIG. 3 is a flow diagram of an example method for replacing cookies deleted from a browser cookie store in accordance with one embodiment of the invention.

FIG. 3 is a flow diagram of an example method 200 for replacing cookies deleted from the browser cookie store 114 in accordance with one embodiment of the invention. The example method 200 includes logic that the control code 121 could implement. Such control coding may be written in JavaScript or other scripting language. The example method 200 can be implemented after the HTML page 120 and the control media 130 have been loaded onto the personal computer 100. The method 200 may begin at step 210 with the control code 121 looping through cookies in the browser cookie store 114 to determine if there are any cookies of interest that would provide information regarding the identity or preferences, for example, of the user. If, at step 215, such cookies are located, then at step 230, the cookies may be stored in the plug-in 106. The control media 130 could then be called to set the cookie value by name at step 235.

If, however, no cookies of interest are located in the browser cookie store 114, then at step 240 the values in the local object store may be looped through, and at step 245, the values may be evaluated for a cookie name. At step 250, the cookie may be set with the value recovered from the local object store 116. At step 260 a refresh flag may be set to true so that, at step 265, the HTML page 120 may be refreshed.

In an alternative embodiment of the invention, the control code 121 may facilitate the paging of cookies into and out of the browser cookie store 114. Such paging is desired if, for example, the web browser 102 maintains a limited number (e.g., 20) of cookies for each web server 110. If a web server 110 has several sections and uses cookies to customize the behavior of each section, the total number of cookies necessary for all sections may exceed the maximum allowed by the web browser 102. The control code 121 may identify what cookies are necessary for the HTML Page 120 based on the section of the page rendered. The control code 121 may call the control media 130, such as a Flash movie, to obtain cookie values for the pertinent section. The Flash movie control media 130 may look in the Flash local object store 116 for the values. If the section's values are in the Flash local object store 116, then the Flash movie control media 130 passes the values back to the control code 121, which would set the values and, if necessary, re-load or refresh the HTML page 120.

Figure 4:
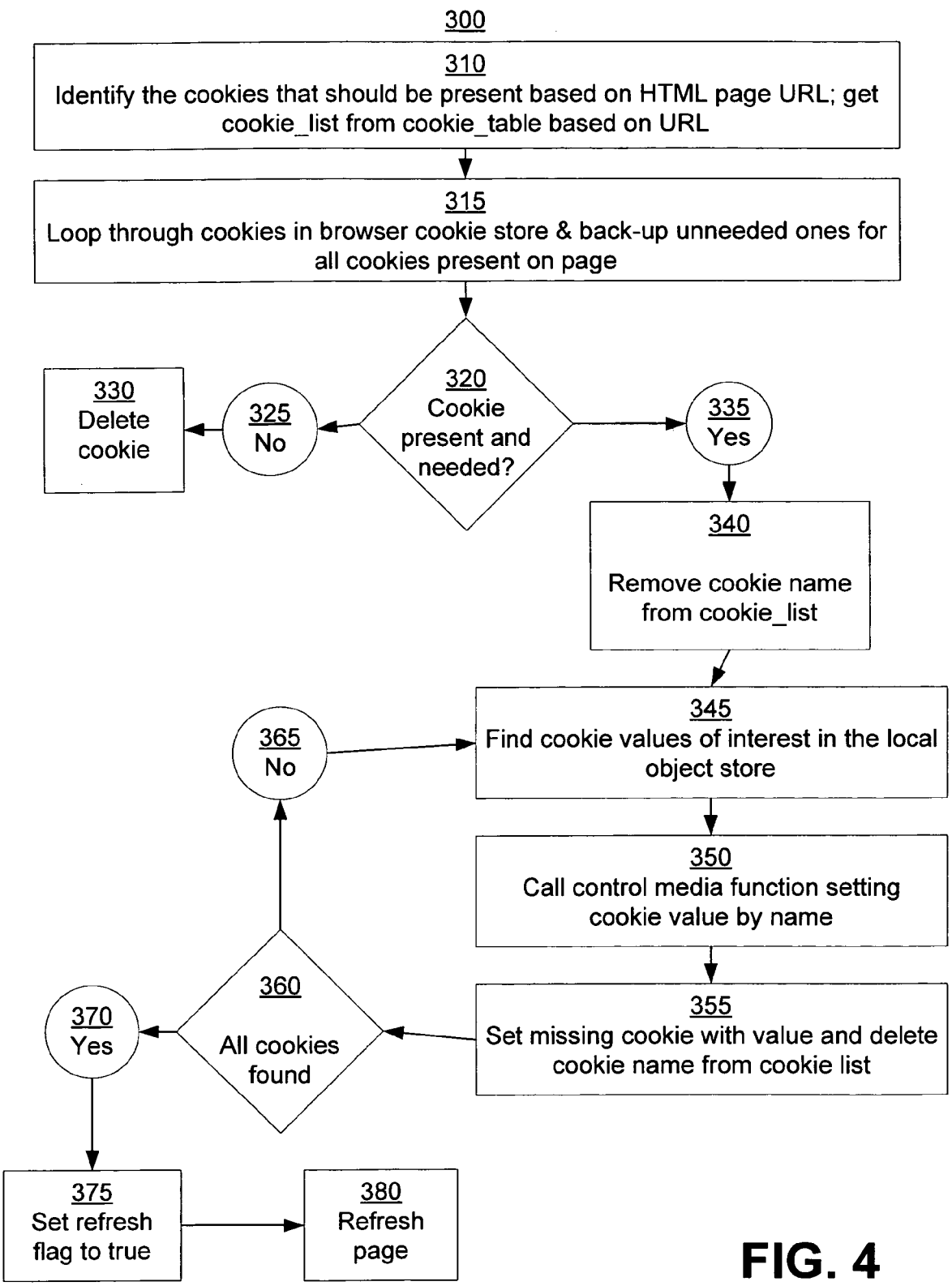
FIG. 4 is a flow diagram of an example method for paging cookies into and out of the browser cookie store in accordance with one embodiment of the invention.

FIG. 4 is a flow diagram of an example method 300 for paging cookies into and out of the browser cookie store 114 in accordance with one embodiment of the invention. At step 310, the control code 121 may identify cookies that should be present on the HTML page 120. Such cookies may be listed on a cookie list. At step 315, the control code 121 may loop through the cookies stored in the browser cookie store 114. If, at step 320, the control code 121 determines that a cookie in the browser cookie store 114 is not necessary for a section of an HTML page 120, then at step 330, the cookie may be deleted from the browser cookie store 114. If the control code 121 determines that the cookie is needed, then the cookie will remain in the browser cookie store 114, and the name of the cookie may be deleted from the cookie list at step 340.

At step 345, the values in the local object store 116 may be looped through to find values for cookies that remain on the cookie list. At step 350, the values may be evaluated for a cookie name, and the values may be assigned to the missing cookie at step 355. At step 360, a determination may be made regarding whether all of the cookies on the cookie list have been located. If not, then the process from step 345 onward may be repeated until all cookies on the cookie list have been found and placed in the browser cookie store 114. When all of the cookies have been placed in the browser cookie store 114, a refresh flag may be set to true at 375 and at step 380, the HTML page 120 may be refreshed.

In yet another example embodiment of the invention, the control media 130 may backup and load cookie values to an external cookie value server located, for example, on the web server 110. The value server is used in place of the local object store 116, and a unique identifier is assigned to link the user to the stored values. In this example, a key value for the user may be stored in the local object store 116 and may be used by the control media 130 to read and write values to the value server. The value server may be able to store more data than the control media 130 can store locally in the local object store 116. Therefore, this example embodiment of the invention may increase the amount of data that can be made available to the control code 121 based on what section of the HTML page 120 has been rendered.

Additionally, there may be instances where a user of the personal computer 100 may have set a parameter preventing any cookies from being stored in the browser cookie store 114. That is, the user may have turned off the cookies. Alternatively, the web browser may not accept or use cookies. An alternative example embodiment of the invention addresses this potential obstacle by using the control code 121 to add query parameters to the URLs for each HTML page 120 downloaded onto the personal computer 100. The query parameters may be added, for example, at the end of the URL. A field on the HTML page may be hidden from the user of the personal computer 100 and may include a unique number associated with the user. In this way, instead of the local object store 116 providing cookie values as described with regard to other embodiments of the invention, the local object store 116 may provide the URLs for each HTML page 120 that the user downloaded. From the URLs with the user-specific query parameters, browser information about the user may be obtained.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A computer-implemented method for creating browser information associated with a user of a computer, the computer comprising a web browser store and a local object store, the local object store being on the computer and in a location independent of the web browser and a web browser store, and accessible through a control media, the computer-implemented method comprising:

receiving a web page to be rendered on the computer, the web page including control media and control code;

determining the existence of browser information in the web browser store using the control code;

accessing the local object store through the control media by using the control code to call into the control media if it is determined that the browser information is not in the web browser store;

retrieving a browser value from the local object store through the control media;

passing the browser value to the control code; and creating the browser information from the browser value, wherein the browser information is placed into the web browser store and is associated with the user of the computer.

2. The method of claim 1, wherein the browser value is a cookie value.

3. The method of claim 1, wherein the browser information is a cookie.

4. The method of claim 3, further comprising:

placing the cookie in the web browser store, wherein the web browser store is a cookie store associated with the web browser.

5. The method of claim 1, further comprising:

writing the browser value to the local object store.

6. The method of claim 5, wherein writing the value to the local object store is completed by a plug-in located on the computer.

7. The method of claim 5, wherein writing the value to the local object store is completed by the control code.

8. The method of claim 1, wherein accessing the local object store is completed by a control media associated with a plug-in located on the computer.

9. The method of claim 1, wherein the local object store is associated with a plug-in located on the computer.

10. The method of claim 1, further comprising:

accessing a cookies store located in the web browser; and removing a cookie from the browser cookie store.

11. The method of claim 1, wherein the browser value is a URL and the browser information is a query parameter in the URL.

12. A computer-implemented method for replacing information deleted from a web browser store associated with a web browser on a computer, the web-browser comprising a plug-in, the computer-implemented method comprising:

inserting a control media into a web page, the control media for accessing a local object store on the computer in a location independent of the web browser store, the local object store being accessible through the control media, the control media comprising a browser value;

inserting control code in the web page for creating browser information from the browser value and for calling into the control media;

determining, by the control code, if the browser information exists in the web browser store;

if the browser information does not exist in the web browser store, calling the control media by the control code to access the local object store through the control media to retrieve the browser information from the local object store and provide the browser information to the control code; and placing the browser information into the web browser store by the control code.

13. The method of claim 12, wherein the browser information is a cookie.

14. The method of claim 12 wherein the browser information is a query parameter.

15. The method of claim 12, wherein the plug-in is Macromedia Flash Plug-in for Flash animation files.

16. The method of claim 15, wherein the control media is a Flash movie.

17. A computer-implemented method for writing a cookie value associated with a cookie name in a local object store on a computer comprising a web browser having an associated web browser cookie store, the local object store in a location on the computer independent of the web browser cookie store and accessible through a control media, the computer-implemented method comprising:

providing control code for calling into control media, the control code and control media being provided in a web page displayed by the web browser;

identifying a cookie by the cookie name in the web browser cookie store using the control code;

accessing the local object store through the control media by using the control code to call into the control media; and writing a browser value associated with a cookie name in the local object store through the control media.

18. The method of claim 17, wherein the browser value is a cookie value.

* * * * *

UNITED STATES PATENT AND TRADEMARK OFFICE
CERTIFICATE OF CORRECTION

| | | |
|---|---|---|
| PATENT NO. | : 7,954,140 B2 | Page 1 of 1 |
| APPLICATION NO. | : 11/023799 | |
| DATED | : May 31, 2011 | |
| INVENTOR(S) | : Jon Badenell et al. | |

It is certified that error appears in the above-identified patent and that said Letters Patent is hereby corrected as shown below:

Column 2, line 53, "HT XML" should read
--HTML/XML--

Signed and Sealed this
Ninth Day of August, 2011

David J. Kappos
*Director of the United States Patent and Trademark Office*